US005755921A

United States Patent [19]

Christensen

[11] Patent Number: 5,755,921

[45] Date of Patent: May 26, 1998

[54] IMAGE TRANSFER PRESS

[75] Inventor: Christopher R. Christensen, Newport, Minn.

[73] Assignee: Fargo Electronics, Inc., Eden Prairie, Minn.

[21] Appl. No.: 514,177

[22] Filed: Aug. 11, 1995

[51] Int. Cl.[6] .......... B32B 35/00

[52] U.S. Cl. .......... 156/391; 156/475; 156/493; 156/581

[58] Field of Search .......... 156/391, 475, 156/493, 581

[56] References Cited

U.S. PATENT DOCUMENTS

| | | | |
|---|---|---|---|
| 76,345 | 4/1868 | Purdy . | |
| 798,805 | 9/1905 | Kurlfinke . | |
| 4,680,067 | 7/1987 | Moore | 156/165 |
| 5,244,529 | 9/1993 | Siegel | 156/384 |
| 5,382,313 | 1/1995 | Eminger | 156/583.1 |
| 5,395,478 | 3/1995 | Sattler | 156/481 |

*Primary Examiner*—Jenna Davis
*Attorney, Agent, or Firm*—Westman, Champlin & Kelly, P.A.

[57] ABSTRACT

A press for transferring images from pictures or substrates to other objects, such as mugs or other cylindrical objects. The press comprises a flexible band or jacket type clamp lined with suitable compressible material and capable of being clamped tightly against a generally cylindrical outer surface of an object, with the image to be transferred against such outer surface. The image is urged into intimate contact with the outer cylindrical surface by the clamping pressure transferred through the compressible material. An adjustable clamp permits ease of placement of the band type press onto the object to which the image is to be transferred.

14 Claims, 3 Drawing Sheets

IMAGE TRANSFER PRESS

BACKGROUND OF THE INVENTION

The present invention relates to an image transfer press that can be utilized for transferring colored images from prints made of color photographs by a sublimation process onto cups or mugs or other objects. Specifically, the transfers are made from printed copies of images that are printed from a thermal dye-sublimation process.

In the prior art, U.S. Pat. No. 5,244,529 describes sublimation and heat transfer devices for imprinting images onto mugs. This patent explains some of the problems involved in the transfer process, such as obtaining uniform heating, and discloses a pair of clamp members that are used to force ends of a mug encircling band together. The clamp members are actuated through an elongated linkage that is quite complex for operation. Further, the press is intended to be used with a special type of heater incorporated into the band. The mug or cup to which an image is to be transferred in patent '529 also has to be supported on a special positioner, aligned with the clamp members.

U.S. Pat. No. 5,382,313 also shows a sublimation image transfer apparatus that has a pair of large, heated blocks that are clamped onto a mug. The blocks leave spaces on both sides of the mug, so no image can be transferred to the mug surface directly opposite a mug handle. This unit requires inserts to handle slightly different size mugs or cylindrical objects. The clamping is by moving one block toward another to react forces from a mug held between the blocks. The blocks are provided with bores that will hold heaters for providing the heat need for image transfer.

SUMMARY OF THE INVENTION

The present invention relates to a transfer press for use in transferring images onto mugs or other cylindrical objects using known techniques for sublimation transfer. The present device is compact and has a peripheral size that is only slightly larger than the mug or other object being imprinted, and within the radius of the handle to permit ease of handling and also to permit use in home ovens.

The embodiment of the present invention disclosed comprises a spring metal band that is closed with an adjustable clamp that clamps the band around the surface of a mug to be imprinted. The band is lined with a suitable silicone foam liner to permit exertion of substantial uniform pressures against a substrate or sheet carrying the image to force the substrate against the surface of the mug. A uniform pressure is provided on the substrate even with slight irregularities in the outer surface of the mug or other object to be imprinted. The silicone foam is selected in density and thickness to accommodate the usual variations in the surfaces of mugs.

Since the clamp is portable and easily adaptable to variations in size of mugs or other cylindrical objects, it can be used easily at home, and the mug and clamp placed in a home oven for completing the transfer of the image to the mug. As is normal, the mug is coated with a coating that is capable of receiving and retaining the vaporized dyes forming the image on the substrate. Such coating is known. For example, polymeric coatings on the outside of the mug or other object can be used.

The present device gives high quality transfers, because it provides good heat distribution and maintains a uniform pressure across a substrate or sheet carrying the image to be transferred.

DETAILED DESCRIPTION OF THE PREFERRED EMBODIMENTS

Figure 1:
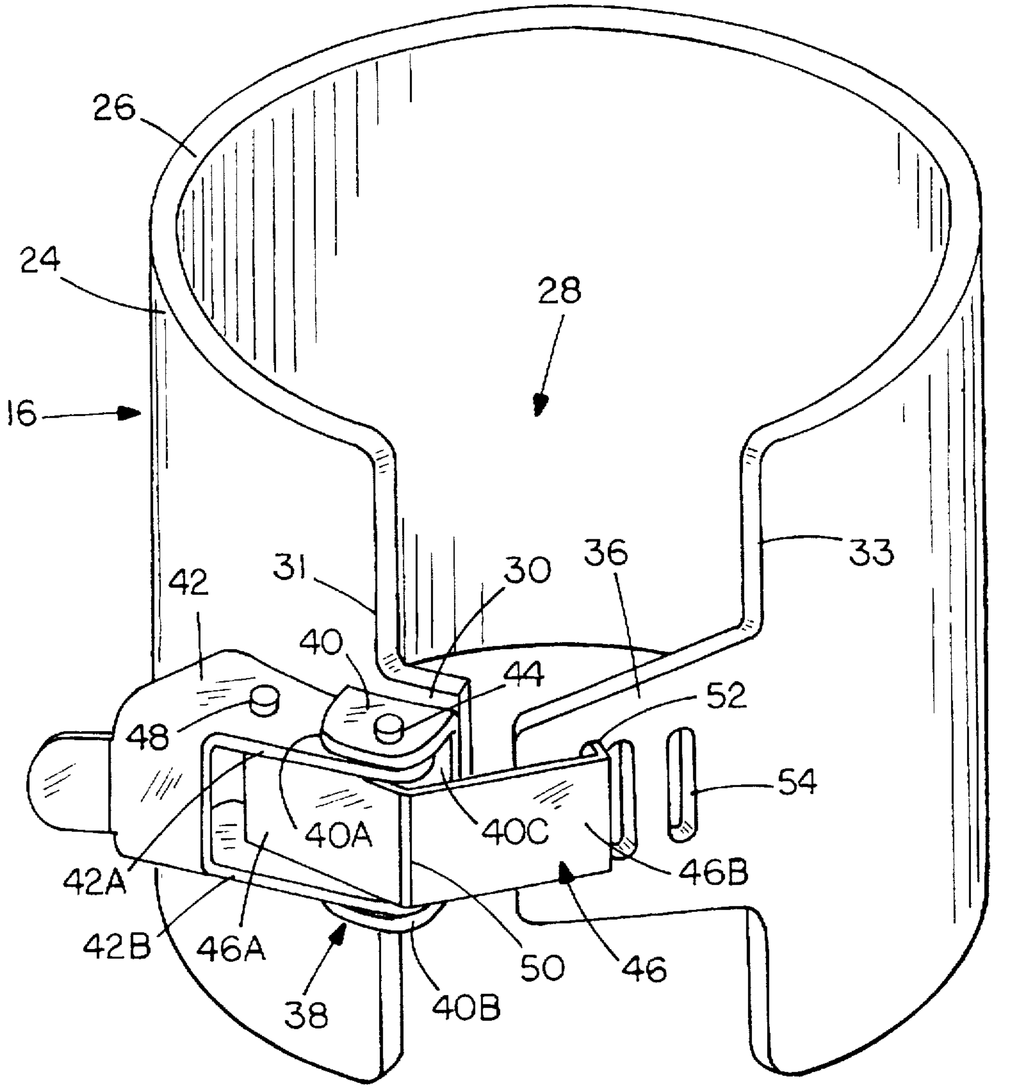
FIG. 1 is a perspective view of a clamp used in the image transfer process of the present invention.
Figure 2:
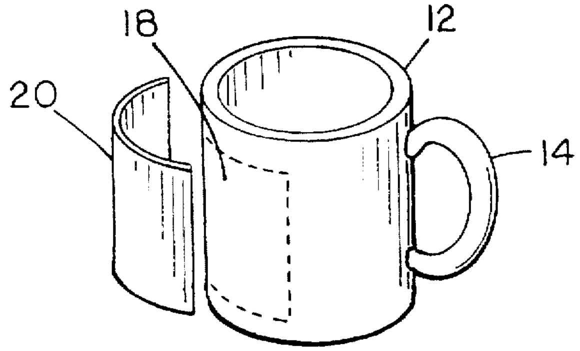
FIG. 2 is a perspective view of a typical mug showing a substrate or sheet carrying an image to be imprinted about to be placed against the surface of the mug.

A typical mug 12 having a handle 14 and a generally cylindrical outer surface is shown in FIG. 2. The mug is of size to be used with the image press of the present invention illustrated in FIG. 1 at 16. The mug 12 has an outer surface 18 that is coated with a suitable polymeric or other coating for receiving a subliminally transferred image from a substrate 20 bearing such image. The substrate could be a sheet having a photo image on one side, which would be transferred onto the mug surface 18. The photo image will be made so that it will subliminally transfer to the mug, and will be received on the coating on the surface 18.

Present color printers using the dye-sublimation color process, such as those made by Fargo Electronics, Inc. of 7901 Flying Cloud Drive, Eden Prairie, Minn. also will provide color prints of photos, or digital images on a sheet of paper that is capable of being used with the present press for transferring images onto a mug or other cylindrical object.

The transfer press is shown generally at 16, and includes an outer thin jacket or band 24 of metal or other thermally conductive material which is formed into a generally cylindrical shape and sized to permit clamping onto the cylindrical surface 18 of the mug 12. Preferably the band 24 is made of 301, 302 or 304 stainless steel. The band 24 is lined with an inner foam layer indicated generally at 26. The foam is a suitable silicone foam that has desired compressibility characteristics. The foam is preferably about ⅛ of an inch in thickness, and lines the entire inner surface of the band 24. The band 24 is selected to have some spring qualities, and in other words it will spring outwardly from a clamped position when a clamp 38 is released.

The band 24 has unattached end edges 31 and 32 that define a gap 28 when surrounding a mug. A first clamp support tab 30 is integral with the band 24 and extends from end edge 31 into the gap 28 toward the opposite end edge 33 of the band 24. A latch tongue 36 is integral with the band 24 and extends from the edge 33 across the gap 28, and is aligned with the support tab 30. The gap 28 is of sufficient size so that it will permit the handle 14 of mug 12 to extend through the gap, with the support tab 30 and the latch tab 36 having the ability to pass into the opening defined by the handle 14 so that the band can be clamped around the mug 12.

An over center type clamp indicated generally at 38 is supported on the support tab 30, and is operable to tighten the band around a mug. A specific embodiment of a clamp is shown, but many different types of clamps can be used, including adjustable clamps, various spring loaded clamps, threaded hose type clamps and the like. However, the clamp has to be capable of exerting enough annular force so that the inward radial loading against a mug exterior surface from the interior surface of the foam layer 26 will be adequate to intimately press the substrate 20 against the surface 18 of a mug or other object in the press.

In the form shown, the clamp 38 has a clamp support 40 that is fixed to the tab 30, and which has a pair of support ears 40A and 40B that are supported on a base 40C and define a space in which a clamp lever 42 is pivotally mounted. The clamp lever 42 is pivotally mounted on a pin 44 that extends through the ears 40A and 40B, and the clamp lever in turn carries a spring latch dog 46 that is positioned between legs 42A and 42B of the clamp lever and is pivotally mounted on a latch dog pin 48. The pin 48 extends between the legs 42A and 42B. The lever has a thumb tab 43 for increased leverage in operation.

As shown, the spring latch dog 46 has a bend 50 forming latch dog legs 46 and 46B that form a shallow "V". The leg 48B has a latch flange 52 formed at its outer end. The length of the latch dog leg 46B between the bend 50 and the latch flange 52 is selected so that it spans the gap 28 when the press is in an open position. The latch flange 52 is of size to fit within one of a series of slots 54 defined in the latch tongue 36.

When the press 16 is to be used, the mug 12 is positioned in place by pivoting the spring latch dog 46 out of the way and passing the latch tongue 36 under the handle 14, while the substrate or sheet 20 carrying the image to be transferred is held against the surface of the mug and is positioned between the inner surface of the foam layer 26 and the mug.

Figure 3:
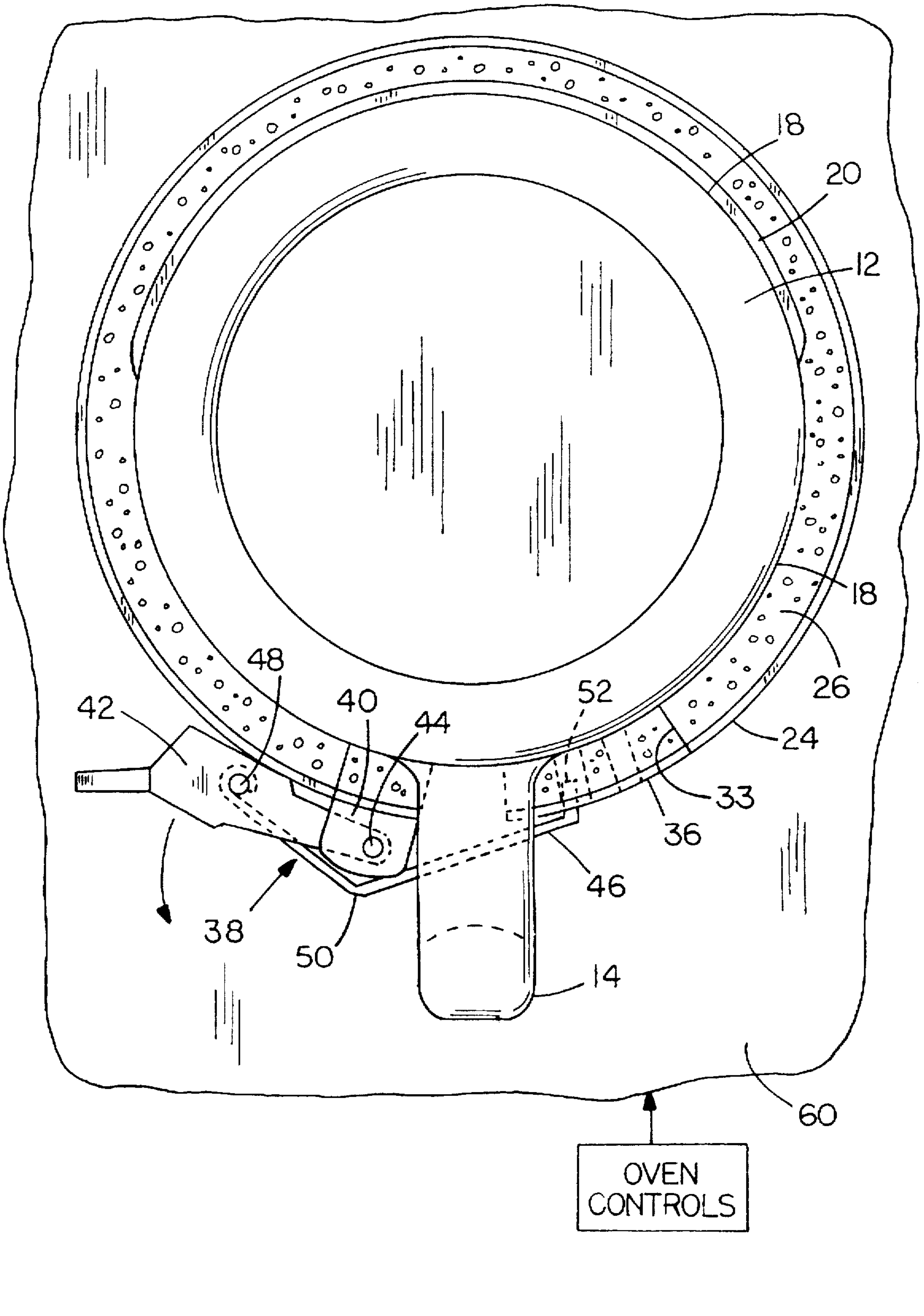
FIG. 3 is a top plan view of the image transfer press of the present invention in place around a mug and in a conventional oven.

As shown in FIG. 3 schematically, the substrate 20 is relatively thin. The substrate is shown in an exaggerated thickness in FIG. 3 for illustration, and is placed against the outer surface 18 of the mug 12 so that the inner surface of the foam layer 26 on the interior of the band 24 compresses to conform around the substrate 20 and urge the substrate 20 tightly against the surface 18.

Figure 4:
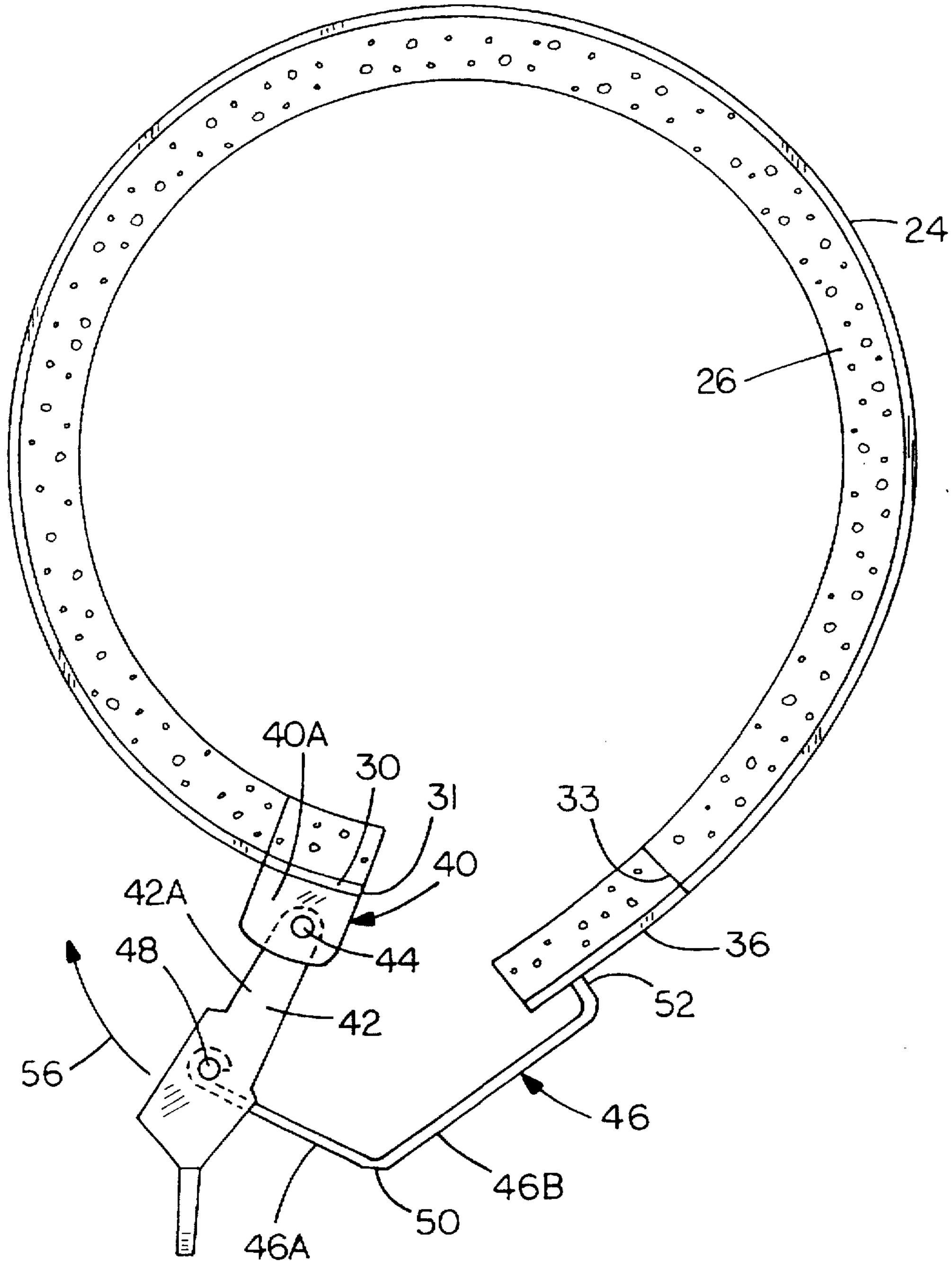
FIG. 4 is a top plan view of the image transfer press of the present invention shown in an open position.

Latch flange 52 is positioned in one of the series of slots 54, with the clamp open, as shown in FIG. 4 and after the mug has been placed into the interior of the open press, the clamp lever 42 is pivoted as shown by the arrow 56 in FIG. 4 to pull the latch tongue 26 toward the latch support 30 and apply an annular tensile load on tongue 36 tending to pull the edges 31 and 33 together to in turn pull the band 24 tightly down against the outer surface 18 of the mug 12. As can be seen in FIG. 3, the handle 14 will protrude from the press, and when the latch 39 is in its latched position the pivots of the spring latch dog 46 and the clamp lever 42 go "over center" so that the spring latch dog 46 is retained in place. The bend 50 tends to straighten out as the legs 46A and 46B tend to extend, to create a spring load on the tongue 36 to tightly urge the band 24 around and against the mug. The amount of surface pressure that is exerted on the substrate by the clamp 38 can be controlled to some extent by the density of the foam or sponge that is used in the layer 26. The foam layer is compressible and as the foam compresses there is an increase in surface pressure urging the substrate 20 against the surface of the mug. Intermediate adjustments can be made by placing the latch dog flange 52 in a different slot 54. The surface pressure on the substrate is made sufficient to insure intimate contact with the coating on surface 18.

When the mug is installed, with the substrate 20 tightly held against the surface 18, the press and mug, as assembled, can be placed into a home oven 60, and by setting the oven control 62 to the desired temperature, the image transfer takes place as the press and mug are heated and retained at the desired temperature for the desired length of time. A temperature of 375° F. in the oven and heating the substrate for 15 minutes has been found satisfactory.

The band 24 (preferably of metal) has good thermal conductivity, and the silicone foam is thin so it does not act as a substantial insulator. The foam has needed compressibility properties. Additionally, the heat generated in the oven will heat the interior of the mug and cause the entire unit to be rapidly heated for the transfer reaction to take place. The press is light weight and its dimensions are not larger than those of the mug, including the handle. In other words, the clamp assembly 38 fits within the circle generated by the radius extending to the outer edge of the handle 14. The clamp fits quite closely to the outer peripheral surface 18 of the mug.

It can be seen in FIG. 3 that the substrate or sheet 20 can be placed directly opposite the handle 14, with the present press, and the substrate can extend around a substantial portion of the surface 18 of the mug 12. The substrate 20 can also be placed any place within the lateral foam boundaries for transfer. The latch assembly is relatively simple, and does not require a large number of linkages or separate power for actuation. The foam 26 lines the interior of support tab 30 and the tongue 36.

The press is easily installed on a mug, and placed into an existing oven for the transfer operation.

The foam or sponge layer, as stated is preferably about ⅛ inch thick, but can be up to about 3/16 inch thick. Thinner layers can be used, but conformability is reduced, so the possibility of non uniform pressure on the substrate is increased. Thicker layers of foam start to provide undesired heat insulation.

Although the present invention has been described with reference to preferred embodiments, workers skilled in the art will recognize that changes may be made in form and detail without departing from the spirit and scope of the invention.

What is claimed is:

1. An image transfer press for transferring images onto an outer surface of a generally cylindrical object coated with a substance receptive to dyes from an image bearing substrate, including;

a flexible band having first and second ends and being formed into a generally cylindrical shape, with the first and second ends free from each other and being spaced apart when surrounding the cylindrical object at least one end of the flexible band having a tongue extending across the space between the ends and terminate short of the outer end of the band;

a lining of a compressible material on an interior of said band, substantially lining the interior of said band; and a clamp assembly mounted on the band adjacent one end of the band and having a member extending to engage and provide a force the tongue on the other end of the band to exert a force to reduce the space between the first and second ends to compress the compressible material against the object and the substrate the flexible band having an axial height, and the tongue having an axial height substantially less than the band.

2. The press of claim 1, wherein the tongue has elements spaced therealong for receiving a portion of the clamp for permitting adjustment of the clamp relative to the tongue for permitting the band to be tightened onto different cylindrical sizes.

3. The press of claim 1, wherein the lining of compressible material has a thickness in the range of ⅛ of an inch, and exerts a radial force forming a surface pressure against an outer surface of the cylindrical object and a substrate held on such outer surface.

4. The press of claim 1, wherein said cylindrical object is a mug having a handle, a space between the spaced apart ends being of sufficient size to clear the handle, the clamp assembly having a clamp base extending from the other end of the band at a center location, and said tongue extending under the handle of the mug toward the clamp base, the clamp assembly including a spring member for engaging the tongue and exerting a spring force on the tongue to tend to reduce the size of the band under a spring load when the clamp assembly is operated.

5. The press of claim 4, wherein the clamp assembly is of size to fit within a circle generated from a radius of the mug encompassing an outer edge of the mug handle.

6. The press of claim 4, wherein said band has a height that is less than the vertical height of a mug on which the band is mounted.

7. An image transfer apparatus for mugs that have a generally cylindrical outer surface and a handle, for transferring images from a substrate onto the outer surface of the mug, comprising a mug press including;

a flexible band having unattached opposite ends;

a layer of foam on an interior surface of said band for engaging the outer surface of a mug positioned within said band, the opposite ends of said band being spaced apart when the foam layer is engaging the outer surface of the mug sufficiently to permit the handle to extend through the space between the opposite ends; and a latch assembly extending from a first end of the band to a second end of the band and passing between an outer portion of the handle and the outer surface of the mug, said latch assembly having a spring loaded latch dog engaging and transferring latching loads to the other end of the band when the band is surrounding the mug with a substrate between the foam layer and the outer surface of the mug and with the latch assembly in a latched position.

8. The apparatus of claim 7, wherein the second end of the band has a tongue extending toward the first end and the latch assembly, said tongue having a series of latch dog retaining portions, and the latch dog extending from the latch assembly for engaging the latch portions to permit adjusting the cylindrical size of the band when the latch assembly is latched.

9. The apparatus of claim 8, wherein the foam layer extends between the first and second ends of the band, and extended along the tongue on the second end of the band.

10. The press of claim 7, wherein said latch dog comprises a flat spring having a bend therein to form two legs which are not coplanar, one of the legs being pivotally mounted to a latch lever on the one end of the band, and the other leg having a member for engaging a complimentary member on the tongue on the second end of the band and providing a spring load to reduce the size of the band when the latch lever is in a latched position.

11. The press of claim 8, wherein the spring loaded latch dog is a part of the latch assembly that passes between an outer portion of the handle and the outer surface of the mug.

12. An image transfer press for mugs that have a generally cylindrical outer surface and a handle, for transferring images from a substrate onto the outer surface of the mug, when heating the mug and press in a separate heated enclosure, the press comprising:

a flexible band having unattached opposite ends and of size to receive a mug therein;

a resilient layer of material on an interior surface of said band for engaging the outer surface of the mug when the band is clamped around the mug, the opposite ends of said band being spaced apart when the resilient layer is engaging the outer surface of the mug sufficiently to permit the handle to extend through the space between the opposite ends; and a latch assembly extending from a first end of the band to a second end of the band and passing between an outer portion of the handle and the outer surface of the mug, and movable to a latched position to clamp the resilient layer against an image carrying substrate and against the mug to form a mug and press assembly for insertion into the heated enclosure.

13. The apparatus of claim 12, wherein the latch assembly comprises a latch dog that spans a space between the opposite ends of the band.

14. The press of claim 13, wherein the latch assembly includes a spring to exert a spring load tending to move the ends of the band together when the latch assembly is in latched position.

* * * * *